UNITED STATES PATENT OFFICE.

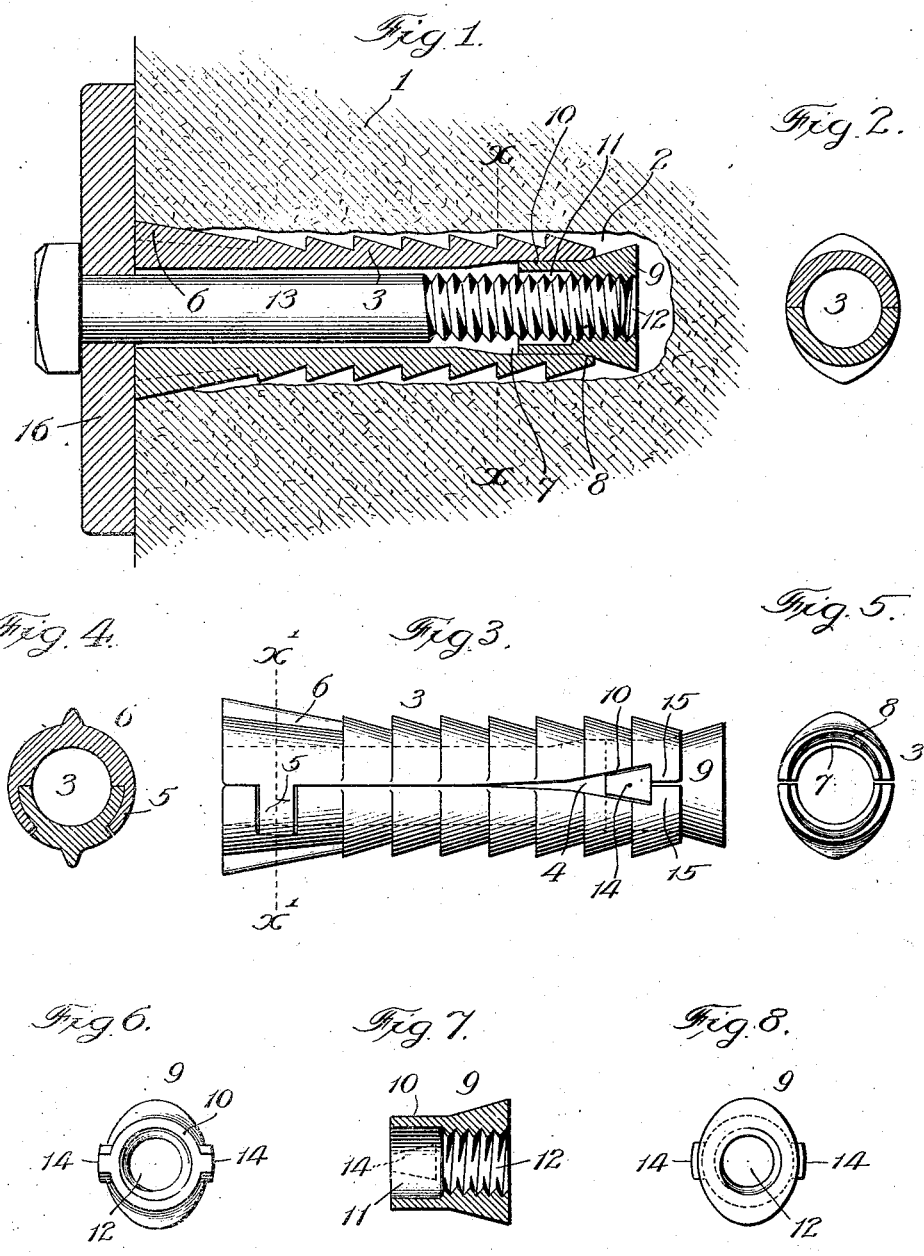

ARTHUR C. BARRETT, OF CHICAGO, ILLINOIS.

EXPANSION-BOLT.

1,090,900.  Specification of Letters Patent.  Patented Mar. 24, 1914.

Application filed June 4, 1912. Serial No. 701,573.

*To all whom it may concern:*

Be it known that I, ARTHUR C. BARRETT, a citizen of the United States of America, and a resident of Chicago, in the county of Cook, State of Illinois, have invented certain new and useful Improvements in Expansion-Bolts, of which the following is a specification.

This invention relates to that class of expansion bolts in which a split sleeve and nut are used in connection with a "machine" type of bolt to attain the functions sought, and the present improvement has for its object to provide a simple and efficient structural formation and combination of parts whereby with an initial driving of the sleeve and nut into place in a wall or like socket a partial expansion of the inner end of the sleeve takes place to cause the same to secure itself against rotation, as the machine bolt is screwed into place to effect the final expansion of the sleeve and the anchoring of the appliance in the wall socket, and with which the proper longitudinal alinement of the expander nut is maintained and so that the point of the machine bolt used will be effectively guided and its screw-thread made to properly engage the screw-threaded portion of said nut; all as will hereinafter more fully appear.

In the accompanying drawings: Figure 1, is a longitudinal section showing my improved expansion bolt in use. Fig. 2, is a transverse section of the sleeve, on line *x—x*, Fig. 1. Fig. 3, is a side elevation of the sleeve. Fig. 4, is a transverse section of same on line *x'—x'*, Fig. 3. Fig. 5, is a rear end elevation of the same. Fig. 6, is a front elevation of the expander nut. Fig. 7, is a central longitudinal section of the same. Fig. 8, is a rear elevation of the same.

Similar reference numerals indicate like parts in the several views.

Referring to the drawings, 1 represents a portion of a building wall, partition or the like, and 2 a socket formed therein for the reception of an expansion bolt. Such socket is ordinarily drilled of substantially uniform diameter throughout its length but owing to careless handling of the drill, the outer end of the socket becomes more or less flared as shown.

3 is a sleeve designed to be driven into the socket. The sleeve is split throughout its length and the members are relatively spaced to provide intervening tapering slots 4 between their adjoining edges. At 5 the members of the sleeve are locked together by lugs of one entering surface recesses of the other, as is clearly shown in Figs. 3 and 4. Exteriorly, the sleeve is given the form of a connected series of truncated cones, the outer one 6 being of a larger diameter and greater length than the others, to fit snugly within the flared outer end of the socket. Thus arranged, they resist rotation or turning of the sleeve in the socket and in taking into the wall thereof, prevent withdrawal or working of the sleeve outward. Interiorly, the sleeve is provided with a smooth bore, which near its rear end is formed into an enlarged cylindrical counterbore 7, which in turn is formed with a flaring rear end portion 8, that merges from a circular into an elliptical form to receive the specially formed expander nut 9. In the present improvement the expander nut 9, also of elliptical cross section at its rear end, is tapered to the angle of the flared portion 8 of the bore of the sleeve 3, and merges from such elliptical form into a circular form at its mid-length. Its forward portion 10 is cylindrical and adapted to have longitudinal travel in the enlarged cylindrical counterbore 7 of the sleeve, and be held thereby in proper longitudinal alinement with the other parts of the appliance previous to the operation of expanding the same into binding engagement in the wall socket 2, aforesaid. In connection with such special construction of the expander nut 9, another material feature of the present improvement comprises the formation of the rear portion of the bore of said nut with a threaded portion 12, adapted for operative engagement with the threaded end of an ordinary machine bolt 13, used in the present appliance, and with an unthreaded cylindrical portion 11 forward of said threaded portion 12 and of the same diameter as the shank of the bolt 13, and adapted to receive the end portion of said bolt and guide it into proper engagement with the aforesaid screw-threaded portion 12 of the bore of the nut, in the practical use of the present appliance.

14 are lugs or projections at diametrically opposite points on the periphery of the nut 9, and adapted to enter and have movement in the tapering slots 4 between the sleeve members above described.

In locking the members together at the outer end only of the sleeve, the inner ends thereof are left free and are separated or forced apart by the action of the tapered nut 9 on entering and being drawn into the bore of the sleeve, as will be hereinafter more fully described. Preferably the nut is relatively proportioned to partly enter the flared end of the sleeve bore without separating the members and is held thus normally by the projections 14 thereof in the slots 4, which latter are closed at the inner end of the sleeve by meeting lugs 15 of the members, and a material feature of the present improvement involves a straight transverse bearing surface between said projections 14 and meeting lugs 15, as shown in Fig. 3.

In order that, in the preliminary operation of forcing the sleeve into place in the wall socket, the machine bolt 13 may be made to engage the nut 9, and in that said nut through the described connection has driving engagement with the sleeve 3, so that as the operator hammers upon the head of the bolt 13, the parts will be readily forced into place in the wall socket, ready for the final expanding operation. Assuming the sleeve to be in position in the socket, the bolt 15 is passed through an opening in the bracket 16 or other article to be secured to the wall, and then on through the bore of the sleeve to engage the thread of the nut 9. On rotating the bolt, the nut is drawn farther into the flared end of the bore of the sleeve, expanding the same by forcing the members thereof apart and causing the ratchet-tooth formation exteriorly of each member, to engage and become embedded in the wall of the socket, firmly locking the several parts of the device together in the socket and forming a secure and safe fastening capable of supporting great weight.

Having thus fully described my said invention what I claim as new and desire to secure by Letters Patent, is:—

1. An expansion bolt sleeve, having a bore the rear portion of which is formed with an expanded cylinder portion and with a flaring rear end portion in connected relation, a coöperating tapered nut having a cylindrical extension at its forward end, and a bolt extending through the bore of the sleeve and threaded into the nut.

2. An expansion bolt sleeve having a bore the rear portion of which is formed with an expanded cylindrical portion and with a flaring rear end portion circular at its point of juncture with said expanded portion and merging therefrom into an elliptical form at its rear end, a coöperating tapered nut of an elliptical form at its rear end and having a cylindrical extension at its forward end, and a bolt extending through the bore of the sleeve and threaded into the nut.

3. An expansion bolt sleeve having a bore the rear portion of which is formed with an expanded cylindrical portion and with a flaring rear end portion circular at its point of juncture with said expanded portion and merging therefrom into an elliptical form at its rear end, a coöperating tapered nut of an elliptical form at its rear end and having a cylindrical extension at its forward end, the bore of said nut having an unthreaded forward portion and a threaded rear portion, and a bolt extending through the bore of the sleeve and threaded into the nut.

4. A sectional expansion bolt sleeve, the sections of which are locked together at one end only and relatively spaced to provide intervening tapering slots the rear ends of which are closed by meeting lugs, a nut having projections disposed in said slots and having straight transverse rear bearing faces, the rear ends of said projections having straight transverse bearing surfaces adapted to afford a straight transverse bearing against the lugs aforesaid in the initial operation of introducing the sleeve into place, and a bolt adapted to draw the nut into the bore of the sleeve.

Signed at Chicago, Illinois, this 3rd day of June 1912.

ARTHUR C. BARRETT.

Witnesses:
 ROBERT BURNS,
 HENRY MOE.